United States Patent
Keshav et al.

(10) Patent No.: US 6,907,421 B1
(45) Date of Patent: Jun. 14, 2005

(54) REGULATING FILE ACCESS RATES ACCORDING TO FILE TYPE

(75) Inventors: Srinivasan Keshav, Mountain View, CA (US); Rosen Sharma, Mountain View, CA (US)

(73) Assignee: Ensim Corporation, Sunnyvale, CA (US)

( * ) Notice: Subject to any disclaimer, the term of this patent is extended or adjusted under 35 U.S.C. 154(b) by 0 days.

(21) Appl. No.: 09/572,672

(22) Filed: May 16, 2000

(51) Int. Cl.$^7$ ............................................. G06F 17/30
(52) U.S. Cl. ........................................ 707/2; 707/205
(58) Field of Search ............................ 707/1, 2, 9, 10, 707/200, 201, 205; 709/202, 229; 710/260; 713/193; 719/318; 725/96

(56) References Cited

U.S. PATENT DOCUMENTS

| | | | |
|---|---|---|---|
| 3,377,624 A | 4/1968 | Nelson et al. | 711/152 |
| 4,177,510 A | 12/1979 | Appell et al. | 711/163 |
| 5,189,667 A | 2/1993 | Esaki et al. | 370/389 |
| 5,212,793 A | 5/1993 | Donica et al. | 718/105 |
| 5,226,160 A | 7/1993 | Waldron et al. | 719/324 |
| 5,249,290 A | 9/1993 | Heizer | 718/105 |
| 5,263,147 A | 11/1993 | Francisco et al. | 711/164 |
| 5,325,530 A | 6/1994 | Mohrmann | 717/124 |
| 5,437,032 A | 7/1995 | Wolf et al. | 718/103 |
| 5,528,753 A | 6/1996 | Fortin | 714/35 |
| 5,572,680 A | 11/1996 | Ikeda et al. | 709/243 |
| 5,584,023 A | 12/1996 | Hsu | 707/204 |
| 5,603,020 A | 2/1997 | Hashimoto et al. | 707/200 |
| 5,623,492 A | 4/1997 | Teraslinna | 370/397 |
| 5,636,371 A | 6/1997 | Yu | 703/26 |
| 5,640,595 A | 6/1997 | Baugher et al. | 710/10 |
| 5,692,047 A | 11/1997 | McManis | 713/167 |
| 5,706,097 A | 1/1998 | Schelling et al. | 358/296 |
| 5,706,453 A | 1/1998 | Cheng et al. | 345/809 |
| 5,708,774 A | 1/1998 | Boden | 714/38 |
| 5,719,854 A | 2/1998 | Choudhury et al. | 370/231 |
| 5,727,203 A | 3/1998 | Hapner et al. | 707/103 R |
| 5,748,614 A | 5/1998 | Wallmeier | 370/395.41 |
| 5,752,003 A | 5/1998 | Hart | 709/223 |
| 5,761,477 A | 6/1998 | Wahbe et al. | 718/1 |
| 5,764,889 A | 6/1998 | Ault et al. | 713/200 |
| 5,781,550 A | 7/1998 | Templin et al. | 370/401 |
| 5,799,173 A | 8/1998 | Gossler et al. | 703/21 |
| 5,809,527 A | 9/1998 | Cooper et al. | 711/133 |
| 5,828,893 A | 10/1998 | Weid et al. | 709/229 |
| 5,838,686 A | 11/1998 | Ozkan | 370/433 |
| 5,838,916 A | 11/1998 | Domenikos et al. | 709/219 |

(Continued)

FOREIGN PATENT DOCUMENTS

WO    WO 99/39261    8/1999

OTHER PUBLICATIONS

Keshav, S., *An Engineering Approach to Computer Networking: ATM Networks, the Internet, and the Telephone Network*, Reading, MA, Addison–Wesley, 1997, pp. vii–xi, 85–115, 209–355, 395–444.

(Continued)

Primary Examiner—Apu Mofiz
(74) Attorney, Agent, or Firm—Fenwick & West LLP

(57) ABSTRACT

File access rates of processes are regulated according to file type. An association table stores entries associating processes to be regulated with specific access rates for various file types. System calls that access files are intercepted, and a system call wrapper executes. The system call wrapper determines the type of file that is being accessed by the process. The system call wrapper examines the association table in order to determine if the calling process is associated with an access rate for the file type being accessed. If so, the system call wrapper regulates access to the file according to the appropriate rate.

21 Claims, 5 Drawing Sheets

U.S. PATENT DOCUMENTS

| | | | |
|---|---|---|---|
| 5,842,002 A | 11/1998 | Schnurer et al. | 703/21 |
| 5,845,129 A | 12/1998 | Wendorf et al. | 710/200 |
| 5,850,399 A | 12/1998 | Ganmukhi et al. | 370/412 |
| 5,860,004 A | 1/1999 | Fowlow et al. | 717/109 |
| 5,864,683 A | 1/1999 | Boebert et al. | 709/249 |
| 5,889,956 A | 3/1999 | Hauser et al. | 709/226 |
| 5,889,996 A | 3/1999 | Adams | 717/139 |
| 5,892,968 A | 4/1999 | Iwasaki et al. | 710/1 |
| 5,905,730 A | 5/1999 | Yang et al. | 370/429 |
| 5,905,859 A | 5/1999 | Holloway et al. | 713/201 |
| 5,913,024 A | 6/1999 | Green et al. | 713/200 |
| 5,915,085 A | 6/1999 | Koved | 713/200 |
| 5,915,095 A | 6/1999 | Miskowiec | 709/223 |
| 5,918,018 A | 6/1999 | Gooderum et al. | 709/225 |
| 5,920,699 A | 7/1999 | Bare | 709/225 |
| 5,933,603 A | 8/1999 | Vahalia et al. | 709/225 |
| 5,937,159 A | 8/1999 | Meyers et al. | 713/201 |
| 5,956,481 A | 9/1999 | Walsh et al. | 713/200 |
| 5,978,373 A | 11/1999 | Hoff et al. | 370/392 |
| 5,982,748 A | 11/1999 | Yin et al. | 370/232 |
| 5,987,524 A | 11/1999 | Yoshida et al. | 709/245 |
| 5,991,812 A | 11/1999 | Srinivasan | 709/232 |
| 5,999,963 A | 12/1999 | Bruno et al. | 718/104 |
| 6,016,318 A | 1/2000 | Tomoike | 370/401 |
| 6,018,527 A | 1/2000 | Yin et al. | 370/395.41 |
| 6,023,721 A | 2/2000 | Cummings | 709/201 |
| 6,038,608 A | 3/2000 | Katsumata | 709/238 |
| 6,038,609 A | 3/2000 | Geulen | 709/250 |
| 6,047,325 A | 4/2000 | Jain et al. | 709/227 |
| 6,055,617 A | 4/2000 | Kingsbury | 711/203 |
| 6,061,349 A | 5/2000 | Coile et al. | 370/389 |
| 6,065,118 A | 5/2000 | Bull et al. | 713/200 |
| 6,075,791 A | 6/2000 | Chiussi et al. | 370/412 |
| 6,075,938 A | 6/2000 | Bugnion et al. | 395/500.48 |
| 6,078,929 A * | 6/2000 | Rao | 707/200 |
| 6,078,957 A | 6/2000 | Adelman et al. | 709/224 |
| 6,086,623 A | 7/2000 | Broome et al. | 703/26 |
| 6,092,178 A | 7/2000 | Jindal et al. | 712/27 |
| 6,094,674 A | 7/2000 | Hattori et al. | 709/203 |
| 6,101,543 A | 8/2000 | Alden et al. | 709/229 |
| 6,108,701 A | 8/2000 | Davis et al. | 709/224 |
| 6,108,759 A | 8/2000 | Orcutt et al. | 711/173 |
| 6,122,673 A | 9/2000 | Basak et al. | 709/238 |
| 6,154,776 A | 11/2000 | Martin | 709/226 |
| 6,154,778 A | 11/2000 | Koistinen et al. | 709/228 |
| 6,161,139 A | 12/2000 | Win et al. | 709/225 |
| 6,167,520 A | 12/2000 | Touboul | 713/200 |
| 6,172,981 B1 | 1/2001 | Cox et al. | 370/401 |
| 6,189,046 B1 | 2/2001 | Moore et al. | 719/315 |
| 6,192,389 B1 | 2/2001 | Ault et al. | 718/101 |
| 6,192,512 B1 | 2/2001 | Chess | 717/127 |
| 6,230,203 B1 | 5/2001 | Koperda et al. | 709/229 |
| 6,240,463 B1 | 5/2001 | Benmohamed et al. | 709/238 |
| 6,247,057 B1 | 6/2001 | Barrera | 709/229 |
| 6,259,699 B1 | 7/2001 | Opalka et al. | 370/398 |
| 6,266,678 B1 * | 7/2001 | McDevitt et al. | 707/201 |
| 6,269,404 B1 | 7/2001 | Hart et al. | 709/243 |
| 6,279,039 B1 | 8/2001 | Bhat et al. | 709/226 |
| 6,279,040 B1 | 8/2001 | Ma et al. | 709/231 |
| 6,282,581 B1 | 8/2001 | Moore et al. | 719/316 |
| 6,282,703 B1 | 8/2001 | Meth et al. | 717/163 |
| 6,286,047 B1 | 9/2001 | Ramanathan et al. | 709/224 |
| 6,298,479 B1 | 10/2001 | Chessin et al. | 717/164 |
| 6,314,558 B1 | 11/2001 | Angel et al. | 717/118 |
| 6,327,622 B1 | 12/2001 | Jindal et al. | 709/228 |
| 6,336,138 B1 | 1/2002 | Caswell et al. | 709/223 |
| 6,351,775 B1 | 2/2002 | Yu | 709/238 |
| 6,353,616 B1 | 3/2002 | Elwalid et al. | 370/443 |
| 6,363,053 B1 | 3/2002 | Schuster et al. | 370/230 |
| 6,370,583 B1 | 4/2002 | Fishler et al. | 709/238 |
| 6,381,228 B1 | 4/2002 | Prieto, Jr. et al. | 370/223 |
| 6,385,638 B1 | 5/2002 | Baker-Harvey | 718/107 |
| 6,389,448 B1 | 5/2002 | Primak et al. | 718/105 |
| 6,393,484 B1 | 5/2002 | Massarani | 709/227 |
| 6,425,003 B1 | 7/2002 | Herzog et al. | 709/223 |
| 6,430,622 B1 | 8/2002 | Aiken, Jr. et al. | 709/245 |
| 6,434,631 B1 | 8/2002 | Bruno et al. | 710/6 |
| 6,434,742 B1 | 8/2002 | Koepele, Jr. | 717/140 |
| 6,438,134 B1 | 8/2002 | Chow et al. | 370/412 |
| 6,442,164 B1 | 8/2002 | Wu | 370/395.21 |
| 6,457,008 B1 | 9/2002 | Rhee et al. | 707/10 |
| 6,463,459 B1 | 10/2002 | Orr et al. | 709/203 |
| 6,470,398 B1 * | 10/2002 | Zargham et al. | 719/318 |
| 6,487,578 B2 | 11/2002 | Ranganathan | 718/104 |
| 6,487,663 B1 * | 11/2002 | Jaisimha et al. | 713/193 |
| 6,490,670 B1 | 12/2002 | Collins et al. | 711/173 |
| 6,499,137 B1 | 12/2002 | Hunt | 717/164 |
| 6,529,950 B1 | 3/2003 | Lumelsky et al. | 709/218 |
| 6,529,985 B1 * | 3/2003 | Deianov et al. | 710/260 |
| 6,542,167 B1 | 4/2003 | Darlet et al. | 715/762 |
| 6,553,413 B1 | 4/2003 | Leighton et al. | 709/219 |
| 6,560,613 B1 * | 5/2003 | Gylfason et al. | 707/200 |
| 6,578,055 B1 | 6/2003 | Hutchison et al. | 707/704 |
| 6,578,068 B1 | 6/2003 | Bowman-Amuah | 709/203 |
| 6,580,721 B1 | 6/2003 | Beshai | 370/428 |
| 6,658,571 B1 | 12/2003 | O'Brien et al. | 713/200 |
| 6,691,312 B1 * | 2/2004 | Sen et al. | 725/96 |
| 2003/0061338 A1 | 3/2003 | Stelliga | 709/224 |

OTHER PUBLICATIONS

Stevens, R. W., *UNIX Network Programming vol. 1 Networking APIs: Sockets and XTI,* Upper Saddle River, NJ, Prentice Hall, 1998, pp. v–xiv, 29–53, 85–110, 727–760.

Tanenbaum, A. S. and Woodhull, A. S., *Operating Systems: Design and Implementation,* Upper Saddle River, NJ, Prentice Hall, 1997, pp. vii–xiv, 1–46, 401–454.

Rubini, A., *LINUX Device Drivers,* Sebastopol, CA, O'Reilly & Associates, Inc., 1998, pp v–x, 13–40.

Goyal, P., et al., "A Hierarchical CPU Scheduler for Multimedia Operating Systems," *Proceedings of the Second Symposium on Operating Systems Design and Impelementations (OSDI'96),* Seattle, WA, Oct. 1996, 15 pages.

Laurie, B. and Laurie, P., *Apache The Definitive Guide,* Sebastopol, CA, O'Reilly & Associates, Inc., Feb. 1999, pp. v–viii, 43–74.

Aho, A. V. and Ullman J. D., *Principles of Compiler Design,* Reading, MA, 1977, pp vii–x, 359–362, 519–522.

Jonsson, J., "Exploring the Importance of Preprocessing Operations in Real–Time Multiprocessor Scheduling," *Proc. of the IEEE Real–Time Systems Symposium—Work–in–Progress session,* San Francisco, CA, Dec. 4, 1997, pp 31–34.

Rusling, D. A., Processes, [online], [retrieved on Dec. 7, 1999]. Retrieved from the Internet: URL: http://www.cebaf.gov/~saw/linux/tlk–html/node44.htm.

Rusling, D. A., Linux Processes, [online], [retrieved on Dec. 7, 1999]. Retrieved from the Internet: URL: http://www.cebaf.gov/~saw/linux/tlk–html/node45.html.

Rusling, D. A., Identifiers, [online], [retrieved on Dec. 7, 1999]. Retrieved from the Internet: URL: http://www.cebaf.gov/~saw/linux/tlk–html/node46.html.

Rusling, D. A., Scheduling, [online], [retrieved on Dec. 7, 1999]. Retrieved from the Internet: URL: http://www.cebaf.gov/~saw/linux/tlk–html/node47.html.

Rusling, D. A., Scheduling in Multiprocessor Systems, [online], [retrieved on Dec. 7, 1999]. Retrieved from the Internet: URL: http://www.cebaf.gov/~saw/linux/tlk–html/node48.html.

Rusling, D. A., Files, [online], [retrieved on Dec. 7, 1999]. Retrieved from the Internet: URL: http://www.cebaf.gov/~saw/linux/tlk–html/node49.html.

Goyal, P. et al., "Start–time Fair Queuing: A Scheduling Algorithm for Integrated Services Packet Switching Networks," Proceedings of ACM SIGCOMM '96, San Francisco, CA, Aug. 1996, 14 pages.

Jánosi, T., "Notes on 'A Hierarchical CPU Scheduler for Multimedia Operating Systems' by Pawan Goyal, Xingang Guo and Harrick Vin," [online], [retrieved on May 8, 2000]. Retrieved from the Internet: URL: http://cs.cornell.edu/Info/Courses/Spring–97/CS614/goy.htm.

Goyal, P., "Packet Scheduling Algorithms for Integrated Services Networks," PhD Dissertation, University of Texas, Austin, TX, Aug. 1997.

Pending U.S. Appl. No. 09/452,286, entitled "Providing Quality of Service Guarantees to Virtual Hosts," filed Nov. 30, 1999.

Pending U.S. Appl. No. 09/499,098, entitled "Selective Interception of System Calls," filed Feb. 4, 2000.

Pending U.S. Appl. No. 09/498,450, entitled "Dynamic Scheduling of Task Streams in a Multiple–Resource System to Ensure Task Stream Quality of Service," filed Feb. 4, 2000.

Pending U.S. Appl. No. 09/500,212, entitled "Disambiguating File Descriptors," filed Feb. 8, 2000.

Pending U.S. Appl. No. 09/502,155, entitled "Restricting Communication Between Network Devices on a Common Network," filed Feb. 11, 2000.

Pending U.S. Appl. No. 09/503,975, entitled "Restricting Communication of Selected Processes to a Set of Specific Network Addresses," filed Feb. 14, 2000.

Pending U.S. Appl. No. 09/526,980, entitled "Enabling a Service Provider to Provide Intranet Services," filed Mar. 15, 2000.

Pending U.S. Appl. No. 09/569,371, entitled "Dymamically Modifying the Resources of a Virtual Server," filed May 11, 2000.

Boehm, B., "Managing Software Productivity and Reuse," IEEE Computer, vol. 32, No. 9, Sep. 1999, 3 pages.

Corbato, F. J. et al. "An Experimental Timesharing System," Proceedings of the American Federation Of Information Processing Societies Spring Joint Computer Conference, San Francisco, CA, May 1–3, 1962, pp 335–344.

Deutsch, P. and Grant, C.A., "A Flexible Measurement Tool for Software Systems," Information Processing 71 (Proc. of the IFIP Congress), 1971, pp. 320–326.

Edjlali, G., et al., "History–based Access Control for Mobile Code," Fifth ACM Conference on Computer and Communication Security, Nov. 3–5, 1998, 19 pages.

Erlingsson, U. and Schneider, F. B., "SASI Enforcement of Security Policies: A Retrospective," Proc. New Security Paradigms Workshop, Apr. 2, 1999, pp 1–17.

Erlingsson, U. and Schneider, F. B., IRM Enforcement of Java Stack Inspection, [online], Feb. 19, 2000, [retrieved on Apr. 2, 2002]. Retrieved from the Internet: URL : http://cs–tr.cs.cornell.edu/Dienst/UI2.0/Show Page/ncstrl.cornell/TR2000–1786.

Evans, D. and Twyman, A., "Flexible Policy–Directed Code Safety," Proc. of 1999 IEEE Symposium on Security and Privacy, Oakland, CA, May 9–12, 1999, pp. 1–14.

Fraser, T. et al., "Hardening COTS Software with Generic Software Wrappers," Proc. of 1999 IEEE Symposium on Security and Privacy, 1999, 15 pages.

Goldberg, I. et al., "A Secure Environment For Untrusted Helper Applications (Confining the Wily Hacker)," Proc. of the Sixth USENIX UNIX Security Symposium, San Jose, CA, Jul. 1996, 14 pages.

Goldberg, R. P., "Survey of Virtual Machine Research," IEEE Computer, Jun. 1974, pp 34–45.

Pandey, R. and Hashii, B., "Providing Fine–Grained Access Control For Mobile Programs Through Binary Editing," Technical Report TR98 08, University of California, Davis, CA, 1998, pp 1–22.

Ritchie, D. M., "The Evolution of the Unix TIme–Sharing System," AT&T Bell Laboratories Technical Journal 63, No. 6, Part 2, Oct. 1984, (originally printed 1979), 11 pages.

Saltzer, J., H. and Schroeder, M. D., The Protection of Information in Computer Systems, [online], 1973, [retrieved on Apr. 2, 2002]. Retrieved from the Internet: URL: http://www.cs.virginia.edu~evans/cs551/saltzer.

Wahbe, R., et al., "Efficient Software–Based Fault Isolation," Proc. of the Symposium on Operating System Principles, 1993, 14 pages.

Plummer, D. C., *An Ethernet Address Resolution Protocol—or—Converting Network Protocol Addresses to 48.bit Ethernet Address for Transmission on Ethernet Hardware,* Nov. 1982, [online], [retrieved on Jan. 17, 2000]. Retrieved from the Internet: URL: http://www.msg.net/kadow/answers/extras/rfc/rfc826.tx.

Huang, X. W. et al., "The ENTRAPID Protocol Development Environment," *Proceedings of IEEE Infocom'99,* Mar. 1999, nine pages.

Duffield, N.G., et al., "A Flexible Model for Resource Management in Virtual Private Networks," *Computer Communication Review Conference, Computer Communication,* ACM SIGCOMM '99 Conference, Cambridge, MA, Aug. 30, 1999–Sep. 3, 1999. pp 95–108.

Campbell, A. T. and Keshav, S., "Quality of Service in Distributed Systems," *Computer Communications 21,* 1998, pp 291–293.

Bach, M. J., *The Design of the Unix® Operating System,* New Delhi, Prentice–Hall of India, 1989, pp v–x, 19–37.

McDougall, R., et al., *Resource Management,* Upper Saddle River, NJ, Prentice Hall, 1999, pp iii–xix, 135–191.

Rijsinghani, A., RFC 1624, May 1994, [online], [retrieved Feb. 2, 2000]. retrieved from the internet: URL: http://www.faqs.org/rfcs/rfc1624.html.

Mallory, T and Kullberg, A., RFC 1141, Jan. 1990 [online], [retrieved Feb. 2, 2000]. retrieved from the Internet: URL: http://www.faqs.org/rfcs/rfc1141.html.

Egevang, K. and Francis P., RFC 1631, May 1994 [online], [retrieved on Feb. 2, 2000]. retrieved from the Internet: URL: http://www.faqs.org/rfcs/rfc1631.html.

Goyal, Pawan et al., *Generalized Guaranteed Rate Scheduling Algorithms: A Framework,* IEEE/ACM Transactions, vol. 5, Issue: 4, Aug. 1997; pp. 561–571.

Symbol Table, [online] copyright 1997, 1998, [Retrieved on Apr. 4, 2003] Retrieved from the internet < URL: http://216.239.33. 100/search?q=cache:eASXk8qC_AC:www.caldera.com/developers/gabi/1998–04–29/ch4.s . . . , pp. 1–5.

* cited by examiner

REGULATING FILE ACCESS RATES ACCORDING TO FILE TYPE

CROSS REFERENCE TO RELATED APPLICATIONS

This application incorporates by reference the entirety of the following patent applications: U.S. patent application Ser. No. 09/500,212, now U.S. Pat. No. 6,560,613 entitled "Disambiguating File Descriptors," filed on Feb. 8, 2000; U.S. patent application Ser. No. 09/499,098, now U.S. Pat. No. 6,529,985 entitled "Selective Interception of System Calls," filed on Feb. 4, 2000; and U.S. patent application Ser. No. 09/452,286, now pending entitled "Providing Quality of Service Guarantees to Virtual Hosts," filed on Nov. 30, 1999. The incorporated applications have the same assignee as the present application.

BACKGROUND

1. Field of Invention

The present invention relates generally to regulating access rates in a computer system, and specifically to regulating file access rates of software processes according to file type.

2. Background of Invention

Multitasking operating systems such as UNIX® and Microsoft WINDOWS NT®are widely utilized in commercial computing systems. Among their many commercial uses, these operating systems are commonly deployed on Internet and other network server computers. With the popularity and success of the Internet, server computer operating systems are currently of great commercial importance.

One function of a multitasking operating system is to allocate system resources to the multiple software processes that simultaneously execute under the control of the operating system. Control over the allocation of system resources by an operating system is commercially useful for a number of reasons. Multitasking operating system are commonly used on Internet web servers by Internet Service Providers (ISP's). Where an ISP provides host services to multiple customers on a single physical computer, it is desirable to allot to each virtual host a specific amount of computer resources appropriate to the needs of the customer, and preferably based upon the amount paid for the services.

For example, suppose two customers purchase host services from an ISP. The first customer is a large corporation providing financial services to thousands of clients internationally. The financial services host requires fast file access, as well as prompt response time to all client requests. Of course, the first customer is willing to compensate the ISP appropriately for providing such a level of host services. The second customer is a sole proprietorship that sells floral arrangements locally. The second customer has a very limited budget, but only requires minimal computer resources. Clearly, it is desirable for the ISP to allocate different percentages of the system resources to the two separate virtual hosts provided by the ISP for the two separate customers.

In the example above, the ISP may wish to provide the financial services host with the ability to access files at the rate of 1,000 bytes per second, but to allow the florist to access files at the rate of only 150 bytes per second. These different access rates would be based upon the different needs of the two customers, and the corresponding different compensation schemes of each. As multitasking operating systems operate today, it would be impossible for the ISP to regulate the file access rates of the different customers. Each process associated with either virtual host simply accesses the file system at the same unregulated rate, and thus it is impossible for the ISP to guarantee or restrict access rates based upon customer need and corresponding financial arrangement. What is needed is a method that facilitates the regulation of the rate at which individual processes access the file system of a multitasking operating system.

Many commercially popular operating systems such as UNIX® and Microsoft WINDOWS NT® treat communication channels as files. In such an operating system, when a process instructs the operating system to create a communication channel, the operating system returns a file descriptor. The communication channel is subsequently accessed via the file descriptor, in a similar manner as a file stored on media.

Communication channels and files stored on media are inherently different, despite the fact that both are accessed via file descriptors. It is often desirable to for an ISP to allow a single process to access files stored on media at one rate, and to access communication channels at another. For example, a customer of the ISP may need to receive and respond to client requests very quickly, but need only an average access time for files stored on the system storage device(s). Such a customer would require (and be willing to pay for) a fast communication channel access rate, but only need (and be willing to pay for) a slower access rate to files stored on media.

Multitasking operating systems today are not capable of regulating the file access rates of different processes generally, much less facilitating different access rates for specific processes based on file type. Currently, each process accesses both files stored on media and communication channels at unregulated rates, not controlled by the operating system. Thus, it is impossible for the ISP to provide customers with different access rates for files stored on media and for communication channels, based upon customer need and corresponding financial arrangement. What is further needed is a method that not only facilitates the regulation of the rate at which individual processes access the file system of a multitasking operating system, but which also allows processes to be regulated to different access rates for different file types.

It is further desirable to not only be able to set separate access rates for communication channels and files stored on media, but to be able set separate access rates for file types generally. Under some operating systems, entities other than communication channels and files stored on media are treated as files, and hence need separate access rates. For example, under the UNIX® operating system, hardware devices are treated as files. For the same reasons that it is desirable to set separate access rates for communication channels and files stored on media, it is further desirable to be able to set a separate access rate for any type of file. Accordingly, what is needed is a method to set separate access rates for individual processes according to file type.

SUMMARY OF INVENTION

The present invention allows regulation of the file access rates of processes according to file type. An association data structure stores associations between processes to be regulated and specific access rates for various file types. In order to regulate processes to their associated access rates, system calls that access files are intercepted. When a process to be regulated makes a system call that accesses a file, the system call is intercepted, and a system call wrapper executes instead. The system call wrapper determines the type of file that is being accessed by the process. The system call wrapper examines the association table in order to determine if the calling process is associated with an access rate for that file type. If not, then the process is not to be regulated for that file type, in which case the system call wrapper simply allows the file access to proceed. Otherwise, the system call wrapper regulates the rate of the access to the file according to the appropriate rate.

The features and advantages described in this summary and the following detailed description are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

I. System Overview

Figure 1:
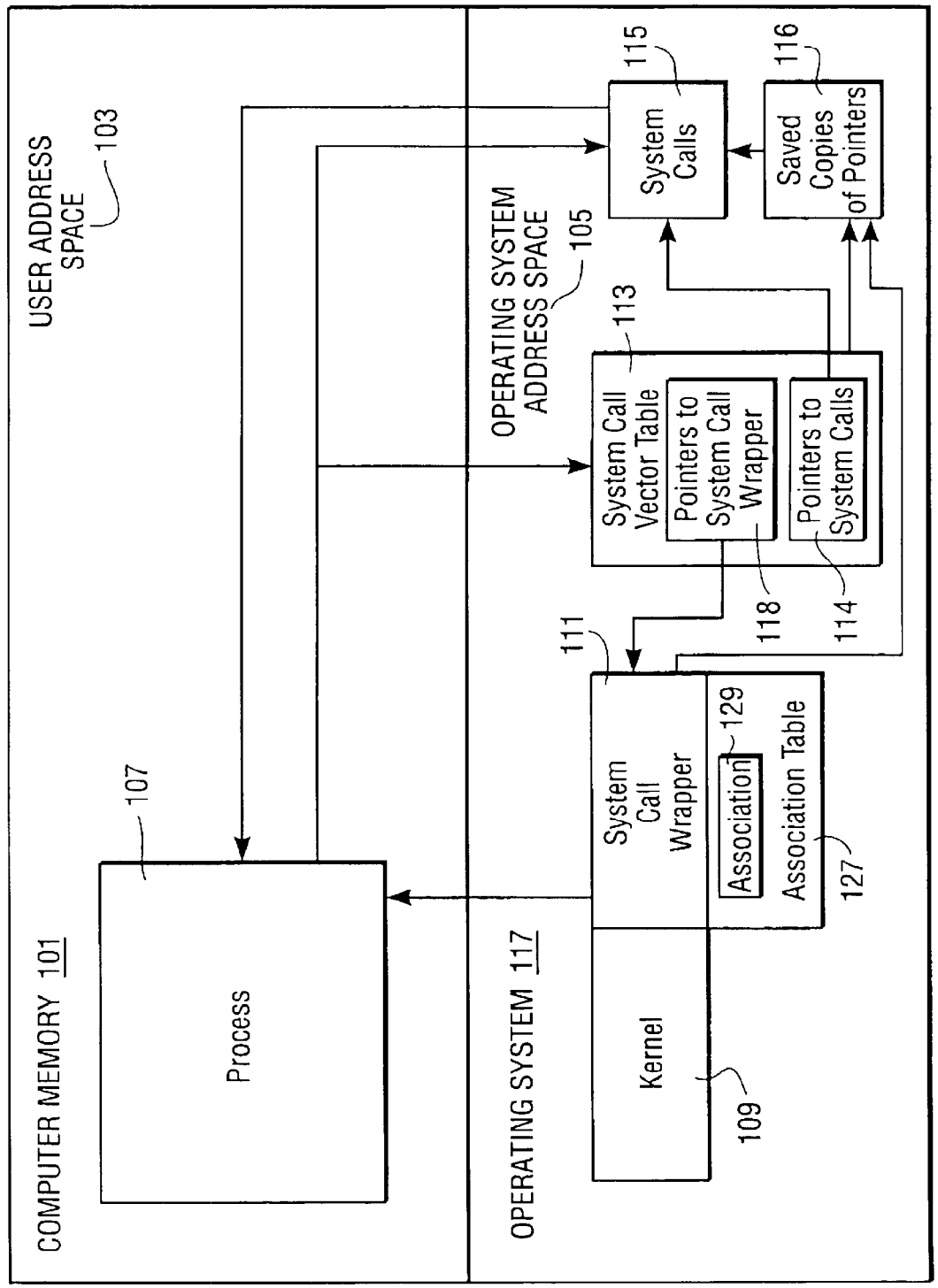
FIG. 1 is a block diagram providing a high level overview of a system for regulating file access rates of processes based upon file type, according to one embodiment of the present invention.

FIG. 1 illustrates a high level overview of a system 100 for regulating file access rates of processes 107 based upon file type according to one embodiment of the present invention. A computer memory 101 includes user address space 103 and operating system address space 105. A process 107 executes in user address space 103. Although FIG. 1 illustrates only a single process 107 executing in user address space 103, it is to be understood that within a given computer memory 101, multiple processes 107 can execute simultaneously.

Preferably, a data structure for storing associations 129 between processes 107 and access rates for file types is inserted into the operating system 117. In one embodiment, the data structure is an association table 127, but in other embodiments other data structures are utilized, for example a linked list. In one embodiment, the association table 127 (or other data structure) is dynamically loaded into the operating system kernel 109, while the kernel 109 is active. In another embodiment, the association table 127 is stored in user address space 103. The maintenance and use of the association table 127 is discussed in detail below.

In order to regulate file access rates, system calls 115 that access files are intercepted. A system call wrapper 111 is utilized in order to intercept system calls 115. In one embodiment, the system call wrapper 111 is dynamically loaded into the operating system kernel 109, while the kernel 109 is active. In another embodiment, the system call wrapper is loaded in user address space 103. The system call wrapper 111 is preferably in the form of object code, the functional features of which are described in detail below.

Pointers 114 to system calls 115 are located in an operating system call vector table 113. It is to be understood that the term "system call vector table" as used herein denotes an area in operating system address space 105 in which there are stored the addresses of system calls. In the UNIX® operating system, this part of the operating system is called the "system call vector table," and that term is used in this specification. Other operating systems employ different terminology to denote the sane system component. A system call vector table by any other name is still within the scope of the present invention.

A copy 116 is made of a pointer 114 to each system call 115 to be intercepted. These copies 116 of pointers 114 are preferably stored in operating system address space 105, but in an alternative embodiment are stored in user address space 103. Once the copies 116 have been made and saved, the pointers 114 in the system call vector table 113 to the system calls 115 to be intercepted are replaced with pointers 118 to the system call wrapper 111, such that when a system call 115 to be intercepted is made, the system call wrapper 111 executes instead. In one embodiment, this copying, storing, and replacing of pointers is performed by the system call wrapper 111. In other embodiments, copying, storing, and replacing of pointers is performed by a pointer management module executing in either operating system address space 105 or user address space 103 as desired. The pointer management module can either be a stand alone program, or a component of a larger application program as desired.

Executing alternative code when a system call 115 is made comprises intercepting the system call 115. The steps of inserting a system call wrapper 111 into the operating system 117, making a copy 116 of an operating system pointer 114 to a system call 115, and replacing the operating system pointer 114 with a pointer 118 to the system call wrapper 111 facilitate interception of a system call 115. When a system call 115 to be intercepted is made, the operating system 117 uses the pointer 118 in the system call vector table 113 to the system call wrapper 111 to execute the system call wrapper 111.

It is to be understood that only system calls 115 that access files need be intercepted, and thus only pointers 114 to system calls 115 to be intercepted are replaced with pointers 118 to the system call wrapper 111. Pointers 114 to system calls 115 which are not to be intercepted are not replaced. Thus, when a non-intercepted system call 115 is made, the system call 115 executes, not the system call wrapper 111.

In one embodiment, a single system call wrapper 111 is loaded into operating system address space 105. Thus, whenever any process 107 makes a system call 115 to be intercepted, the system call wrapper 111 executes. In another embodiment, techniques described in the "Selective Interception of System Calls" application are used to associate a specific system call wrapper 111 with each process to be regulated.

Processes 107 execute in user address space 103 under control of the operating system 117, and make system calls 115. When a process makes a system call 115 that accesses a file, the system call wrapper 111 determines the type of the file being accessed. The system call wrapper 111 also examines the association table 127 to determine whether the process 107 that made the system call 115 is associated with an access rate for that file type. If so, the system call wrapper 111 regulates the file access rate appropriately. Otherwise, the access is allowed to proceed normally. Note that even in the embodiment in which processes 107 to be regulated are associated with individual system call wrappers 111, the system call wrapper still determines if the process 107 is associated with a rate for the file type being accessed, because an individual process 107 may be regulated for some file types and not for others.

II. Storing Associations by a Regulator Program

Figure 2:
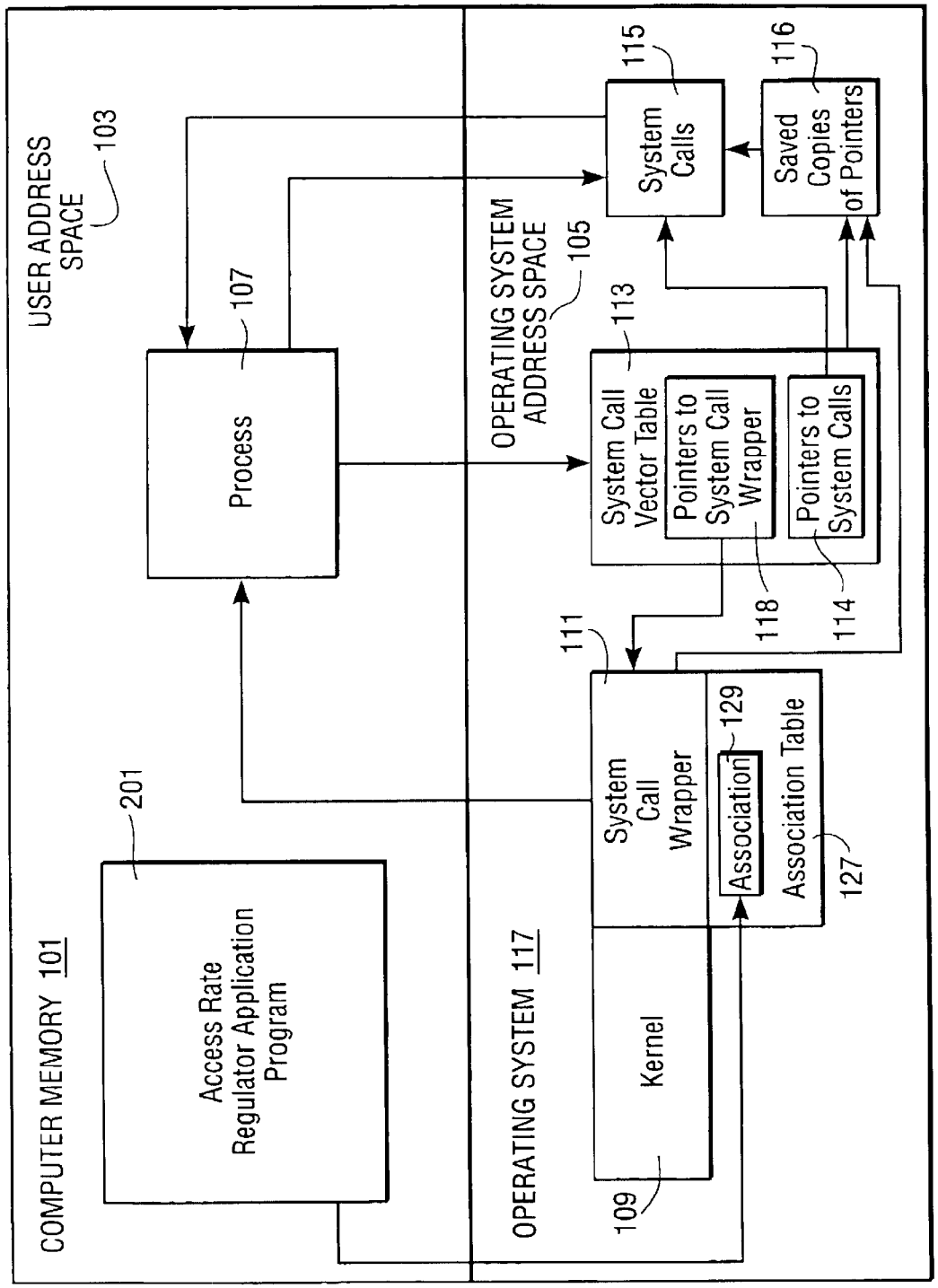
FIG. 2 is a block diagram illustrating a system for managing an association table by an access rate regulator program, according to one embodiment of the present invention.

FIG. 2 illustrates one embodiment of a system 200 for regulating file access rates of processes 107 based upon file type. In the embodiment illustrated by FIG. 2, the association table 127 is managed by an access rate regulator program 201.

The access rate regulator program 201 modifies the operating system 117 of the computer to include the association table 127. Preferably, the regulator program 201 loads the association table 127 into the kernel 109 of the operating system 117 while the kernel is active.

For each process 107 to be regulated, the regulator program 201 stores, in the association table 127, an association 129 between the process 107 and an access rate for at least one file type. For example, suppose a process 107 associated with a financial services host is to be regulated to 1,000 bytes per second for files stored on media, and to 1,400 bytes per second for communication channels. The regulator program 201 would store two associations for the process 107, the first indicating the access rate for files stored on media (1,000 bytes per second), and the second the access rate for communication channels (1,400 bytes per second). Of course, the regulator program 201 can add, modify, and delete associations 129 from the association table 127, as desired.

III. Storing Associations by a Loader Program

Figure 3:
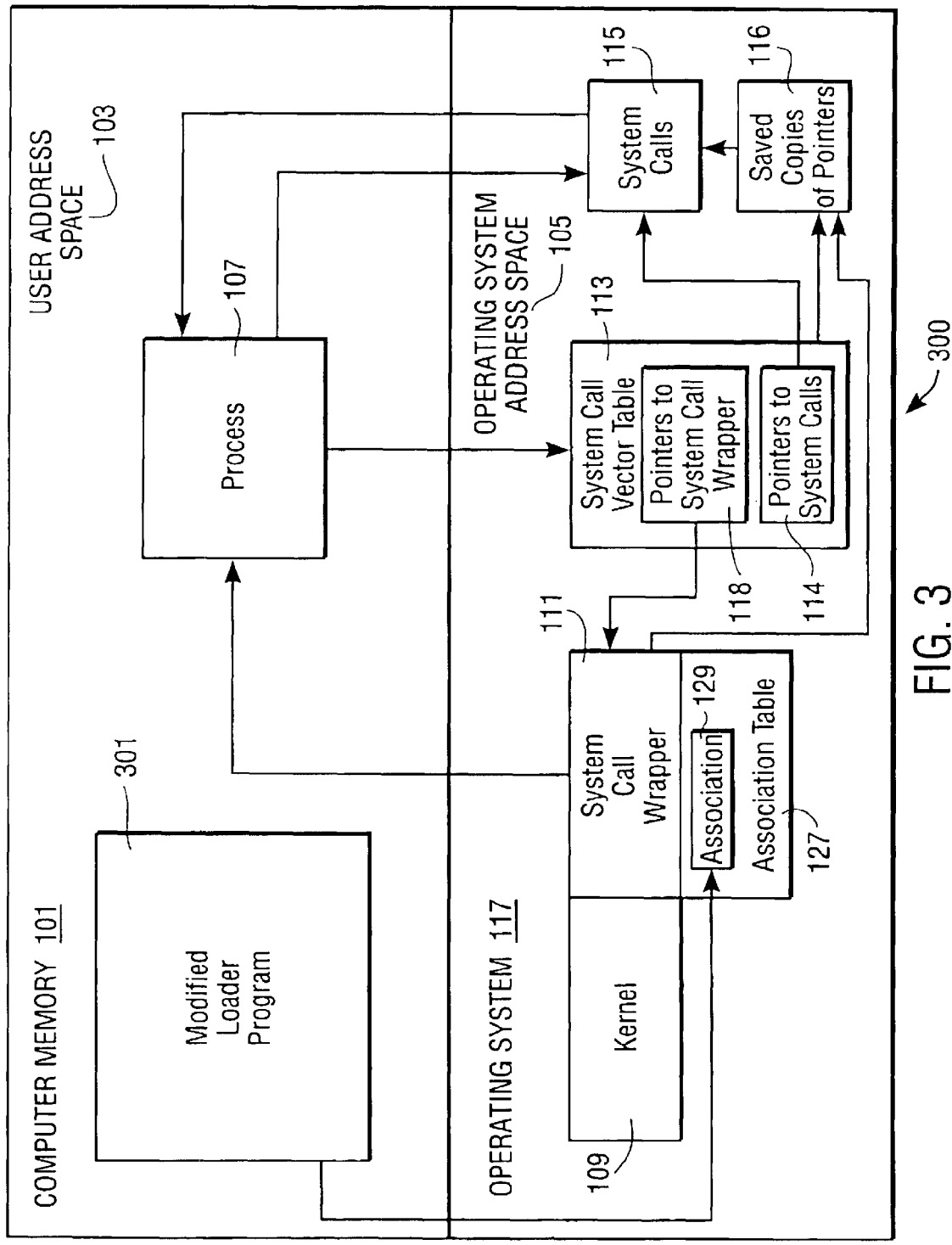
FIG. 3 is a block diagram illustrating a system for managing an association table by a modified loader program, according to another embodiment of the present invention.

FIG. 3 illustrates another embodiment of a system 300 for regulating file access rates of processes 107 based upon file type. In the embodiment illustrated by FIG. 3, processes 107 to be regulated are loaded by the modified loader program 301, which also stores the associations 129.

A loader program is an operating system utility that is used to execute computer programs that are stored on static media. Typically, a loader program loads an executable image from static media into user address space 103 of computer memory 101, and then initiates execution of the loaded image by transferring execution to the first instruction thereof.

Like a standard loader program, the modified loader 301 loads executable images from static media into user address space 103. Additionally, the modified loader program 301 stores, in the association table 127, at least one association 129 between the process 107 and a file access rate. Thus, whenever a process 107 to be regulated is loaded, the association table 127 is updated as needed.

In other embodiments, in addition to storing associations, the modified loader program 301 uses methodology described in detail in the "Selective Interception of System Calls" application in order to associate an individual system call wrapper 111 with the loaded process 107. In different embodiments, the system call wrapper 111 associated with the process is loaded into process address space of the process, user address space 103, or operating system address space 105 as described in the "Selective Interception of System Calls" application. In each of these embodiments, whenever the process 107 makes a system call 115 to be intercepted (i.e., a system call 115 that accesses a file) the system call wrapper 111 associated with the process 107 executes, and proceeds to manage the regulation of the file access rate. Regulation of file access rate by system call wrappers 111 generally is discussed in detail below.

IV. Determining the File Type

When a system call wrapper 111 executes, the system call wrapper determines the type of the file being accessed. Once the file type has been determined, the system call wrapper 111 examines the association table 127 to determine whether the process 107 that made the system call 115 is associated with an access rate for that file type. If so, the system call wrapper 111 regulates the file access rate appropriately. Otherwise, access of files of that type by the process 107 is not to be regulated, so the access is allowed to proceed normally. In one embodiment, the determination is made using methodology described in the "Disambiguating File Descriptors" application. Other techniques such as file extension or file name can also be used as desired.

V. Regulating the Access Rate

Figure 4:
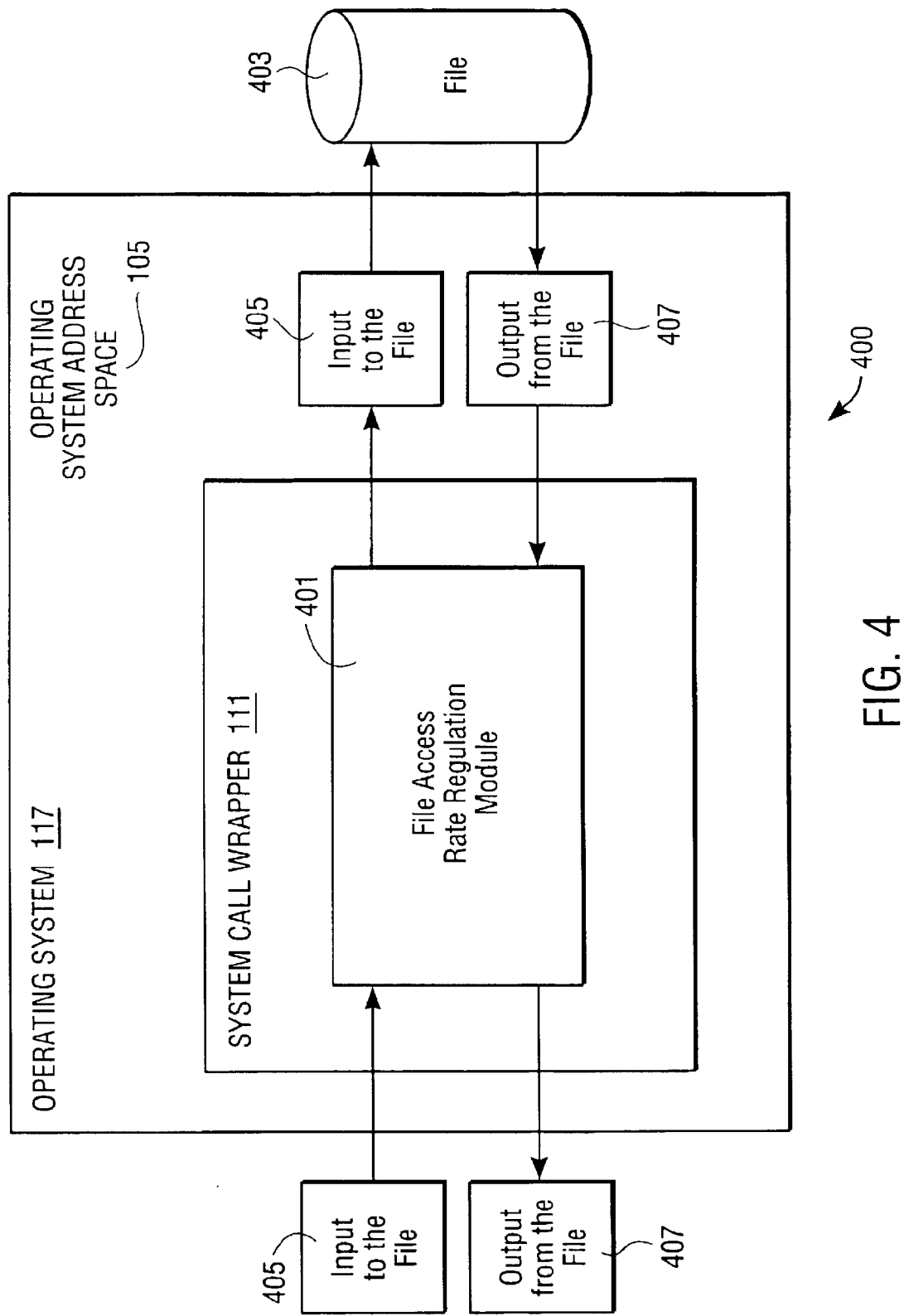
FIG. 4 is a block diagram illustrating a system for regulating file access rate, according to one embodiment of the present invention.

FIG. 4 illustrates one embodiment of a system 400 for regulating file access rate. After determining the file type being accessed, the system call wrapper 111 executes a file access rate regulation module 401 in order to regulate the access rate of the file 403 by the process 107. In one embodiment, the file access rate regulation module 401 executes in operating system address space 105, as illustrated in FIG. 4. In another embodiment, the file access rate regulation module 401 executes in user address space 103. The file access rate regulation module 401 can either be a section of the system call wrapper (as illustrated), a stand alone program, or a component of a larger application program as desired. In any case, the file access rate regulation module 401 applies a known rate regulation technique to the access of the file 403 by the process 107. More specifically, data being written to the file 403 by the process (input to the file 405) is routed through the file access rate regulation module 401. The file access rate regulation module 401 controls the rate at which the input 405 is sent to the file 403 by the process. Likewise, data read by the process 107 from the file (output from the file 407) is also routed through the file access rate regulation module 401, which controls the rate at which the output 407 is sent to the process 107.

Many techniques for regulating access rate are known. In one embodiment, the file access rate regulation module 401 uses a leaky-bucket regulator to regulate the access rate. A leaky-bucket regulator is one specific example of a technique for regulating access rates. A leaky-bucket regulator is described in *An Engineering Approach to Computer Networking*, Srinivasan Keshav, 1997, Addison Wesley, Chapter 7, at pp 403-405, which is incorporated herein by reference.

Figure 5:
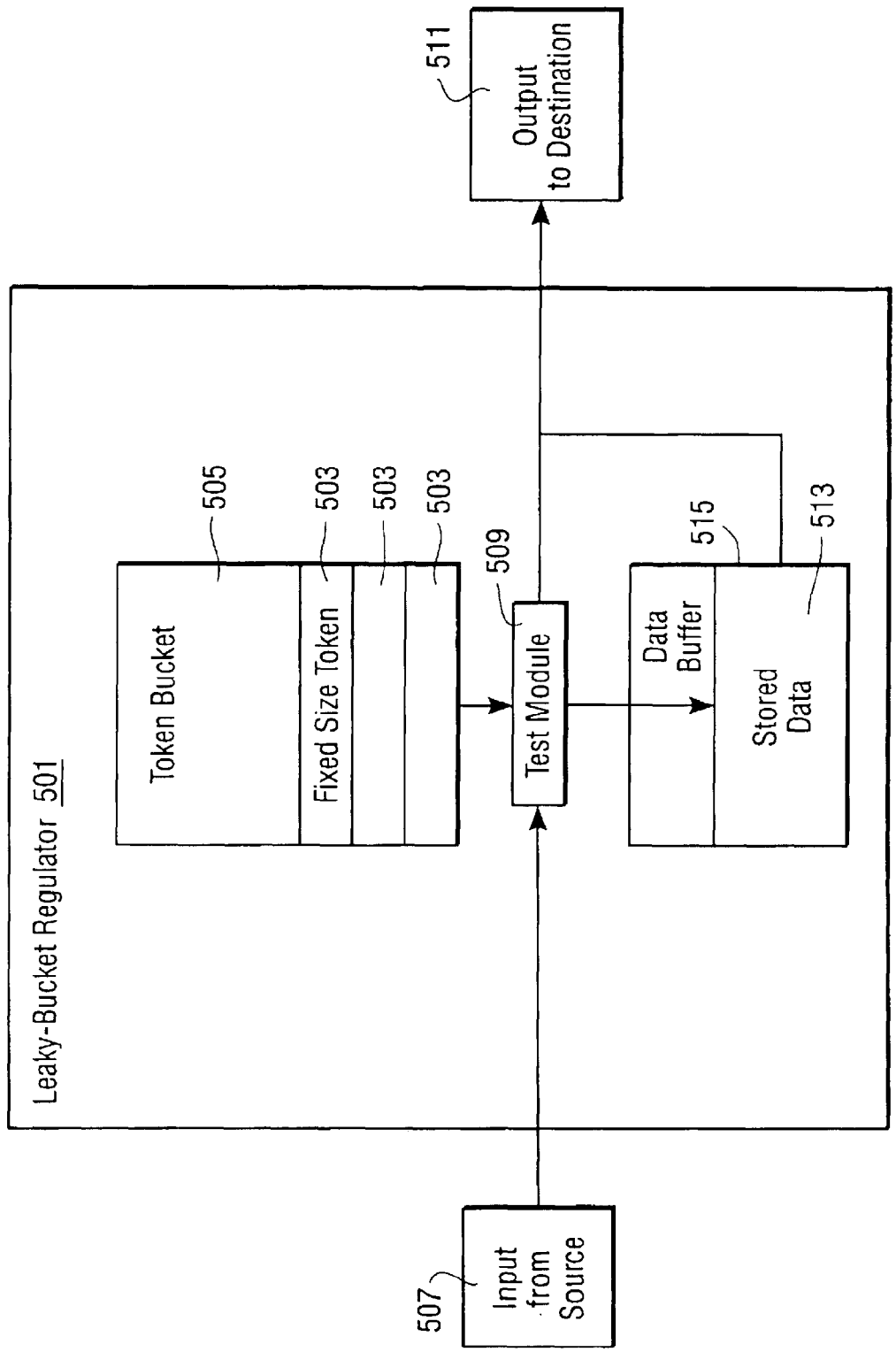
FIG. 5 is a block diagram illustrating a leaky-bucket regulator according to one embodiment of the present invention.

FIG. 5 illustrates a leaky-bucket regulator 501. As illustrated in FIG. 5, the leaky-bucket regulator 501 stores fixed sized tokens 503 in a data structure known as a token (or leaky) bucket 505. Each token 503 constitutes permission for the regulator 501 to send a certain number of bits to a destination. The regulator 501 adds tokens 503 to the bucket 505 at a fixed rate, R. The bucket 505 overflows if the number of tokens 503 crosses some threshold, called its depth, D.

Data arrives at the regulator 501 as input 507 from a source. A test module 509 examines the bucket 505, to determine the sum of the sizes of the tokens 503 therein. The regulator 501 only sends the data as output to a destination 511 if the sum equals or exceeds the size of the data. When data is sent as output 511, the regulator 501 removes tokens 503 corresponding to the output 511 size from the token bucket 505.

If the sum is less than the size of the input 507, the input 507 is held as stored data 513 in a data buffer 515. Once the bucket 505 contains sufficient tokens 503, the stored data 513 is sent as output 511.

A leaky-bucket regulator 501 limits the size of a burst of output 511 to a little more D. The size can be slightly greater than D because tokens 503 may be added to the bucket 505 while output 511 equal in size to D is being sent. Over the long term, the rate at which output 511 is sent by the regulator 501 is limited by the rate R at which tokens 503 are added to the bucket 505. Thus, the leaky-bucket regulator 501 can be used to regulate a process 107 to an access rate for a file type by setting R to that access rate.

For example, suppose the system call wrapper 111 determines that the file access write for a process 107 is 1,000 bytes per second. The system call wrapper passes the rate to the leaky-bucket regulator 501, which proceeds to set R to the rate. Thus, the regulator 501 adds 1,000 byte tokens 503 to a bucket 505 at a rate of once per second. The system call wrapper 111 then routes the communication between the process 107 and the file through the regulator 501, which regulates the access rate to 1,000 bytes per second.

Note that if the process 107 is writing data to a file 403, the input to the file 405 becomes the input 507 to the leaky bucket regulator 501, and the output 511 from the leaky bucket regulator 501 is sent to the file 403. On the other hand, if the process 107 is reading data from a file 403, the output from the file 407 becomes the input 507 to the leaky bucket regulator 501, and the output 511 from the leaky bucket regulator 501 is sent to the process 107.

In other embodiments, other access rate techniques are employed by the file access rate regulation module 401, for example moving average, jumping average, or peak rate.

As will be understood by those familiar with the art, the invention may be embodied in other specific forms without departing from the spirit or essential characteristics thereof. Likewise, the particular capitalization or naming of the modules, protocols, features, attributes or any other aspect is not mandatory or significant, and the mechanisms that implement the invention or its features may have different names or formats. Accordingly, the disclosure of the present invention is intended to be illustrative, but not limiting, of the scope of the invention, which is set forth in the following claims.

What is claimed is:

1. A computer-implemented method for regulating file access rates of processes according to file type, the computer-implemented method comprising:

intercepting a system call attempts to access a file;

determining whether a process that made the intercepted system call is associated with an access rate corresponding to a type of the file being accessed;

in response to the attempt to access the file by the process, determining the associated access rate for the type of the file being accessed; and regulating the process to access of the file at the determined rate.

2. The method of claim 1 further comprising:

storing an association between a selected process the an access rate for at least one file type.

3. The method of claim 2 wherein:

storing the association is performed by a process executing in user address space.

4. The method of claim 1 further comprising:

selecting a process to associate with an access rate for at least one file type;

loading the selected process into process address space by a modified loader program; and storing, by the modified loader program, an association between the selected process and the access rate for at least one file type.

5. The method of claim 1 further comprising:

associating at least two different access rates with a single process, each access rate corresponding to a different file type.

6. The method of claim 1 further comprising:

associating at least two different access rates with at least two different processes.

7. The method of claim 1 wherein:

in response to the determination that the process is associated with the access rate, regulating the process to access of the file at the associated rate.

8. The method of claim 1, further comprising:

determining the type of the file being accessed.

9. The method of claim 1, further comprising:

associating at least one process with the access rate for at least one file type.

10. A computer-readable program product for regulating file rates of processes according to file type, the computer-readable program product comprising:

program code for intercepting a system call attempts to access a file;

program code for determining whether a process that made the intercepted system call is associated with an access rate corresponding to a type of the file being accessed;

program code for, in response to the attempt to access the file by the process, determining the associated access rate for the type of the file being accessed;

program code for regulating the process to access of the file at the determined rate; and a computer readable medium on which the program codes are stored.

11. The computer-readable program product of claim 10 father comprising:

program code for storing an association between a selected process and an access rate for at least one file type.

12. The computer-readable program product of claim 10 further comprising:
   program code for selecting a process to associate with the access rate for at least one file type;
   program code for loading the selected process into process address space; and
   program code for storing an association between the selected process and the access rate for at least one file type.

13. The computer-readable program product of claim 10 further comprising:
   program code for associating at least two different access rates with a single process, each access rate corresponding to a different file type.

14. The computer-readable program product of claim 10 further comprising:
   program code for associating at least two different access rates with at least two different processes.

15. The computer-readable program product of claim 10 further comprising:
   program code for, in response to the determination that the process is associated with the access rate, regulating the process to access of the file at the associated rate.

16. The computer-readable program product of claim 10 further comprising:
   program code for determining the type of the file being accessed.

17. The compute-readable program product of claim 10 further comprising:
   program code for associating at least one process with the access rate for at least one file type.

18. A computer implemented system for regulating file access rates of processes according to a file type, the system comprising:
   an interception module, for intercepting system calls that access files, the interception module being coupled to a determination module;
   at least one system call wrapper, for determining whether a process that made an intercepted system call is associated with an access rate corresponding to a type of the file being accessed, the system call wrapper being coupled to the interception module;
   the determination module for, in response to an attempt to access a file by the process, determining the associated access rate for the type of the file being accessed; and
   coupled to the determination module, a file access rate regulation module, for regulating the process to access of the file at the determined rate.

19. The computer system of claim 18 further comprising:
   a selection module for selecting the process to associate with the access rate for at least one file type, the selection module being coupled to the determination module; and
   a modified loader program for loading the selected process into process address space, and for storing the association between the selected process and the access rate for at least one file type, the modified loader program being coupled to the selection module.

20. The computer system of claim 18 further comprising:
   a storage module, for storing the association between a selected process and the access rate for at least one file type, the storage module being coupled to the determination module.

21. A computer-implemented method for regulating file access rates of processes according to file type, the method comprising:
   associating processes with rates for accessing files of specific types;
   detecting attempts by processes to access files by intercepting system calls that access files;
   determining associated access rates for the types of files being accessed; and
   regulating processes to access of the files at the associated rates.

* * * * *

UNITED STATES PATENT AND TRADEMARK OFFICE
CERTIFICATE OF CORRECTION

PATENT NO. : 6,907,421 B1
DATED : June 14, 2005
INVENTOR(S) : Srinivasan Keshav et al.

It is certified that error appears in the above-identified patent and that said Letters Patent is hereby corrected as shown below:

Column 8,
Lines 5 and 47, please insert -- that -- after "call"
Line 15, please delete "process the an" and insert -- process and the --
Line 45, please insert -- access -- after "file"
Line 47, please insert -- that -- after "call"
Line 61, please delete "father" and insert -- further --

Column 9,
Line 28, please delete "compute-readable" and insert -- computer-readable --
Line 33, please delete "a file" and insert -- file --

Signed and Sealed this

Ninth Day of August, 2005

JON W. DUDAS
*Director of the United States Patent and Trademark Office*